(12) United States Patent
Zhang et al.

(10) Patent No.: US 10,896,693 B1
(45) Date of Patent: Jan. 19, 2021

(54) NEGATIVE THERMAL EXPANSION LAYER FOR HEAT ASSISTED MAGNETIC RECORDING MEDIA

(71) Applicant: Seagate Technology LLC, Cupertino, CA (US)

(72) Inventors: Lihong Zhang, Singapore (SG); Xiong Liu, Singapore (SG); Hongbo Wang, Fremont, CA (US); Xinwei Li, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 424 days.

(21) Appl. No.: 15/454,587

(22) Filed: Mar. 9, 2017

Related U.S. Application Data

(60) Provisional application No. 62/305,841, filed on Mar. 9, 2016.

(51) Int. Cl.
*G11B 5/73* (2006.01)
(52) U.S. Cl.
CPC .......... *G11B 5/7366* (2019.05); *G11B 5/7361* (2019.05); *G11B 5/7363* (2019.05)
(58) Field of Classification Search
CPC ... G11B 5/7325; G11B 5/7366; G11B 5/7361; G11B 5/7363
See application file for complete search history.

(56) References Cited

U.S. PATENT DOCUMENTS

| 8,941,950 B2 | 1/2015 | Yuan et al. |
| 2016/0064020 A1* | 3/2016 | Ikai ........................ G11B 5/483 369/13.13 |

OTHER PUBLICATIONS

English machine translation, JP 2012-123855; TDK corp, 2012, pp. 1-10.*
Song et al. ("Review in antiperovskite manganese nitrides with negative thermal expansion properties", Acta Metallurgica Sinica—Chinese Edition—47(11):1362-1371 • Nov. 2011).*
English machine translation, JP 2007-026511,2007, pp. 1-7.*
https://en.wikipedia.org/wiki/Heat-assisted_magnetic_recording, 2019.*

* cited by examiner

*Primary Examiner* — Holly C Rickman
(74) *Attorney, Agent, or Firm* — Mueting Raasch Group

(57) ABSTRACT

A stack comprises a substrate, a magnetic recording layer, and a negative thermal expansion layer disposed between the substrate and the magnetic recording layer. The negative thermal expansion layer is configured to reduce thermal profile changes of a surface of the stack opposite the substrate during a heat assisted magnetic recording write operation.

20 Claims, 5 Drawing Sheets

NEGATIVE THERMAL EXPANSION LAYER FOR HEAT ASSISTED MAGNETIC RECORDING MEDIA

RELATED PATENT DOCUMENTS

This application claims the benefit of Provisional Patent Application Ser. No. 62/305,841 filed on Mar. 9, 2016, to which priority is claimed pursuant to 35 U.S.C. § 119(e), and which is incorporated herein by reference in its entirety.

SUMMARY

Some embodiments discussed herein involve a stack comprising a substrate, a magnetic recording layer, a soft magnetic underlayer, disposed between the substrate and the magnetic recording layer, and a negative thermal expansion (NTE) layer disposed between the substrate and the soft magnetic underlayer. The NTE layer is configured to reduce thermal profile changes of a surface of the stack opposing the substrate.

Some embodiments discussed herein involve a stack comprising a substrate, a magnetic recording layer, a soft magnetic underlayer disposed between the substrate and the magnetic recording layer, a heatsink layer disposed between the substrate and the soft magnetic underlayer, and a negative thermal expansion (NTE) layer disposed between the substrate and the heatsink layer. The NTE layer is configured to reduce thermal profile changes of a surface of the stack opposing the substrate.

Further embodiments discussed herein involve a method for forming a magnetic recording stack that reduces heat assisted magnetic recording drive clearance variation during a heat assisted magnetic recording write operation to the stack. The method includes forming a negative thermal expansion layer over a substrate and forming a magnetic recording layer over the NTE layer. Additionally a heatsink layer may be formed over the NTE layer and/or one or more soft magnetic layers may be formed over the heatsink layer.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
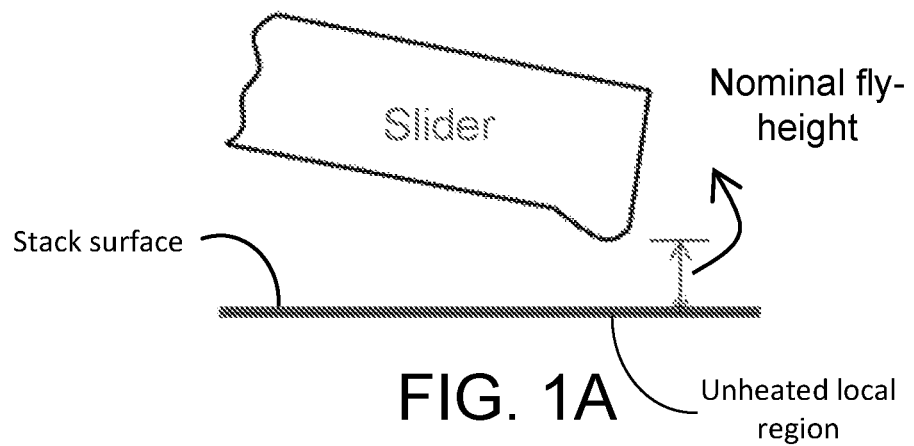
FIG. 1A is a side view of a head-disk interface showing an unheated local region below the slider.

Heat assisted magnetic recording (HAMR) is a technology that enables storage density in hard disk drives beyond 1 Tb/in$^2$. The recording process starts by heating a local region of a magnetic recording stack. For example, the local region of the stack may be heated such that the temperature of the magnetic recording layer of the magnetic recording stack rises to about the Curie temperature ($T_c$) of the magnetic recording layer. In some implementations the local region may be heated to a temperature that is slightly less than the Curie temperature or above the Curie temperature of the magnetic recording stack so long as the anisotropy (K) of the magnetic material in the local region is reduced sufficiently to allow the magnetic field produced by the magnetic recording head to write data to the heated local region. The local region is subsequently cooled rapidly in the presence of the magnetic field from the recording head. The magnetic field maintains the orientation of magnetization in the local region as the region cools, thereby encoding or "writing" information to the magnetic stack for storage.

By reducing the local region media anisotropy (K) by heating at high temperature, e.g., near, at, or above $T_c$ of the magnetic recording layer, HAMR makes it possible to record data on magnetic material that has a high anisotropy at room temperature. The high anisotropy of magnetic materials suitable for HAMR, such as L10-FePt, extends the superparamagnetic limit faced by conventional magnetic recording, so that the grain size of the magnetic recording medium can be further reduced while maintaining or increasing the signal-to-noise ratio. Materials for the magnetic recording layer that are suitable for HAMR have a stability factor ($K_u V/k_B T$) greater than about 60 wherein K is magnetic anisotropy constant, V is magnetic grain volume, $k_B$ is Boltzmann's constant, and T=300 K.

Temperatures generated at a local region while performing a HAMR write operation to the magnetic stack (e.g., temperatures near, at, or above $T_c$ of the magnetic material) can change the recording medium thermal profile due to thermal protrusion of the local region. The protrusion causes the gap between the surface of the magnetic recording stack and the magnetic recording head to decrease relative to the nominal gap present at the local region when the local region is not heated.

Changes in the thermal profile of the stack surface can lead to unpredictable head-disk clearance variations and may also cause thermal fatigue failures of the stack materials being heated. Materials, and application thereof, to magnetic recording media such as HAMR media, are described herein to reduce thermal protrusion of the media surface under the magnetic write head during HAMR write operations. These materials reduce, or minimize, thermal protrusion and thereby provide for enhanced HAMR drive reliability and further maturing HAMR technology.

Previous attempts to control thermal protrusion at the stack surface involved consideration and adjustment of all layer materials concurrently. In contrast, the approaches described herein are directed to a single layer material for the HAMR stack to reduce protrusion during HAMR writing. Incorporation of a negative thermal expansion (NTE) layer into the magnetic stack decreases the thermal protrusion of a local region of the magnetic stack undergoing a HAMR write operation when compared to an identical magnetic stack without the NTE layer. In some embodiments the NTE layer may include multiple sub-layers.

The approaches outlined herein are simpler and easier to achieve as compared with current, conventional techniques intended to reduce thermal protrusion of perpendicular HAMR recording stacks. Thus, HAMR hard drive reliability can be enhanced by using the disclosed approaches to achieve a substantially flat media surface facing the HAMR recording head during writing in HAMR drives.

A HAMR stack can be heated during a HAMR writing operation using a HAMR slider that includes a near field transducer (NFT). Heating using the NFT during writing can heat a local region of the magnetic stack, creating a localized "hot-spot" of 400-800° C. (e.g., a temperature near, at, or above the Curie temperature of the magnetic stack's recording layer). Traditional approaches using media materials having a relative high CTE (thermal expansion coefficient) of $9\text{-}17 \times 10^{-6}$ K$^{-1}$ can cause the heated local region of magnetic recording stack having a thickness of about 150 nm to protrude by 0.61-1.2 nm, or even up to 1.8 nm. This profile change (surface increase and variation) increases the head-disk contact probability as the slider and NFT interface typically maintains a close clearance with the stack surface during read and/or write operations. The thermal profile changes may also lead to mechanical fatigue failures and film delamination due to the stresses/strains created in the media stack structure. Reducing the media thermal profile changes by reducing thermal protrusions at the local region of the magnetic stack undergoing NFT heating can achieve enhanced drive reliability.

The fly height is the minimum distance between the surface of the stack and the slider. Maintaining a substantially consistent distance between the slider and the stack surface is preferred during HAMR read and/or write operations.

FIG. 1A illustrates a HAMR slider and a stack surface before a thermal protrusion is created. The minimum gap between the stack surface and the HAMR slider is referred to as the "fly-height." A nominal fly-height, e.g., about 1-2 nm, is present when the local region is unheated.

Figure 1B:
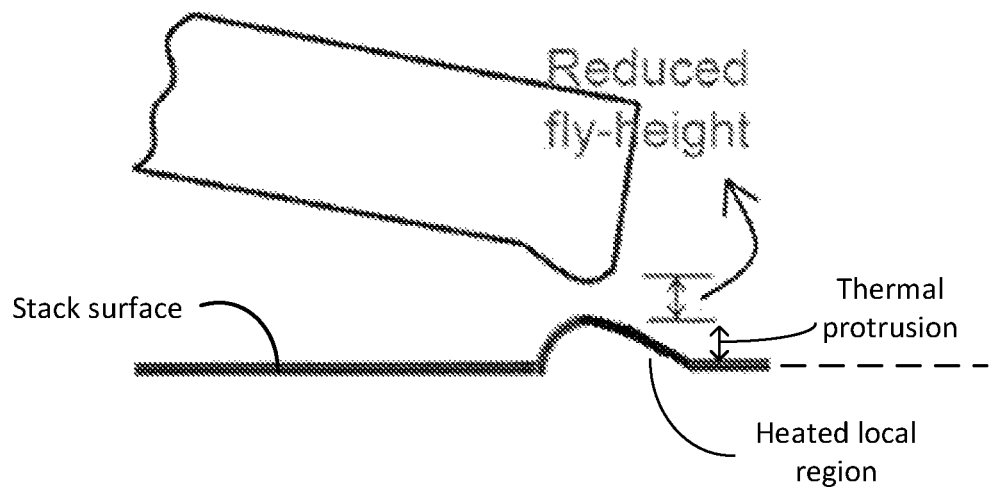
FIG. 1B is a side view of a head-disk interface where the disk surface includes a thermal protrusion at a heated local region.

FIG. 1B illustrates the HAMR slider and stack surface when the local region is heated and a thermal protrusion is created. When the local region undergoes a HAMR write operation, the heat produced by the NFT, located at or near the point of the slider closest to the stack surface, causes thermal profile changes in the surface of the HAMR stack. As shown in FIG. 1B, a variation (e.g., a thermal protrusion toward the slider) in the thermal profile of the stack surface occurs when the local region is heated. The protrusion reduces the fly-height when compared to the nominal, unheated fly-height of the local region, at least temporarily. Reduction of the fly-height introduces variation in the HAMR drive clearance during writing. If the disk surface can be maintained to be substantially flat during NFT heating for HAMR write operations, the clearance variations and the stresses and strains associated with thermal expansion and contraction can be reduced or eliminated and the reliability of the magnetic recording stack is enhanced.

The approaches described herein can provide for thermal protrusion in the local region of less than about 0.5 nm, less than about 0.25 nm, less than about 0.2 nm, or even less than about 0.15 nm when the local region is heated to the writing temperature of the magnetic recording layer. The approaches described herein can provide a substantially flat or low protrusion stack surface when the local region is heated to a writing temperature that is near, at, or above the Curie temperature of the magnetic recording layer of the stack.

These protrusion and/or flatness values can be achieved by using a negative thermal expansion (NTE) layer in the magnetic recording stack, the NTE layer having a negative coefficient of thermal expansion (CTE).

The NTE layer can neutralize the thermal expansion of the HAMR media under NFT heating and thereby enhance overall media surface flatness during HAMR writing. According to embodiments discussed herein, the NTE layer is an additional layer introduced in the stack.

Figure 2:
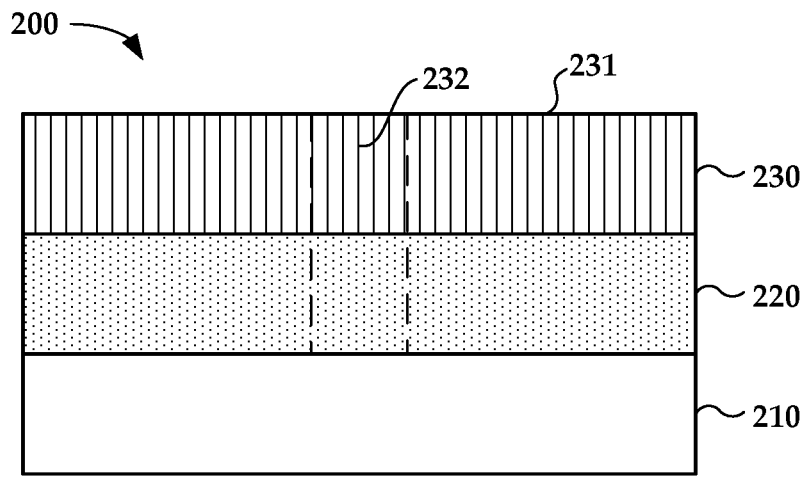
FIG. 2 is a cross-sectional diagram of a magnetic stack in accordance with embodiments discussed herein.

FIG. 2 is a cross-section view of an exemplary HAMR stack 200. The stack 200 may include a substrate 210, such as a glass substrate. The stack 200 includes one or more magnetic recording layers 230 suitable for HAMR. An NTE layer 220 is disposed between the substrate 210 and the magnetic recording layer 230.

In various embodiments, a number of additional layers may be disposed between the magnetic recording layer 230 and the NTE layer 220 and/or between the NTE layer 220 and the substrate 210. These additional layers are not shown in FIG. 2; however, some possible additional layers and their positional relationship with respect to the substrate 210, NTE layer 220, and magnetic recording layer 230 are discussed below. Optionally, protective coatings such as a carbon overcoat and/or lubricant can be formed over the magnetic recording layer 230.

In some embodiments, the NTE layer 220 is configured to reduce protrusion of a surface 231 of the stack 200 opposite the substrate 210 at a local region 232 to less than about 0.5 nm when at least a portion of the local region 232 is heated to a magnetic writing temperature of the magnetic recording layer 230. For example, the magnetic writing temperature may be near, at, or above the Curie temperature of the magnetic recording layer 230. According to some embodiments the NTE layer 220 may be configured to reduce protrusion of the local region 232 to less than about 0.25 nm or even less than about 0.15 nm when the magnetic recording layer is heated to the magnetic writing temperature.

The stack 200 shown in FIG. 2 can be suitable for HAMR recording. For example, the stability factor ($K_u/k_BT$) of the magnetic recording layer 230 may be equal to or greater than about 60.

According to some implementations, the NTE layer 220 comprises a single layer. In other implementations, the NTE layer 220 can include a plurality of sub-layers. At least one sub-layer of the plurality of sub-layers may have a thermal expansion coefficient that is different from the thermal expansion coefficient of at least another sub-layer of the plurality of sublayers.

The NTE layer 220 may have a thermal expansion coefficient greater than about $-0.5 \times 10^{-6}$ K$^{-1}$, or greater than about $-10 \times 10^{-6}$ K$^{-1}$, or greater than about $-20 \times 10^{-6}$ K$^{-1}$. The NTE layer 220 may have a thermal expansion coefficient less than about $-30 \times 10^{-6}$ K$^{-1}$ or less than about $-40 \times 10^{-6}$ K$^{-1}$, or less than about $-50 \times 10^{-6}$ K$^{-1}$, for example.

The NTE layer 220 may comprise one or more materials exhibiting negative coefficients of thermal expansion. For example, materials having negative CTEs can include manganese-based nitrides (e.g., Mn$_3$AN, A=Cu/Sn, Zn/Sn, Ge); manganese-based nitrides (e.g., Mn$_3$Cu$_{1-x}$B$_x$N, B=Co, Ni, Zn, Ga, Ge, Rh, Pd, Ag, In, Sn, Sb); copper-manganese-based nitrides (e.g., Cu—Mn$_3$AN, A=Cu/Sn, Zn/Sn or Ni/Ge); FeNi or doped FeNi alloys; tungstates such as ZrW$_2$O$_8$; ReO$_3$ and (HfMg)(WO$_4$)$_3$. The NTE layer 220 can include Sm$_{2.75}$C$_{60}$, Bi$_{0.95}$La$_{0.05}$NiO$_3$, Invar (Fe-36Ni), Invar (Fe₃Pt), $Tm_2Fe_{16}Cr$, CuO nano particles, Ni-based oxide $Bi_{0.95}La_{0.05}NiO_3$, $LaCu_3Fe_4O_{12}$, $LiAlSi_4$, and cyanides such as $Cd(CN)_2$.

The NTE layer 220 may comprise at least one of the following: manganese-based nitrides, manganese-based nitrides, copper-manganese-based nitrides, FeNi, doped FeNi alloys, tungstates, and $(HfMg)(WO_4)_3$.

The NTE layer 220 may comprise at least one of the following: $Sm_{2.75}C_{60}$, $Bi_{0.95}La_{0.05}NiO_3$, Invar (Fe-36Ni), Invar (Fe₃Pt), $Tm_2Fe_{16}Cr$, CuO nano particles, Ni-based oxide $Bi_{0.95}La_{0.05}NiO_3$, $LaCu_3Fe_4O_{12}$, $LiAlSiO_4$, and cyanides.

For example, the above-identified materials exhibit negative coefficients of thermal expansion from about $-0.5 \times 10^{-6}$ $K^{-1}$ to about $-30 \times 10^{-6}$ $K^{-1}$.

The thickness of the NTE layer 220 can be from about 300 nm to about 600 nm depending upon the thermal expansion coefficients and thicknesses of both the NTE layer 220 and materials of other layers in the stack 200.

Figure 3:
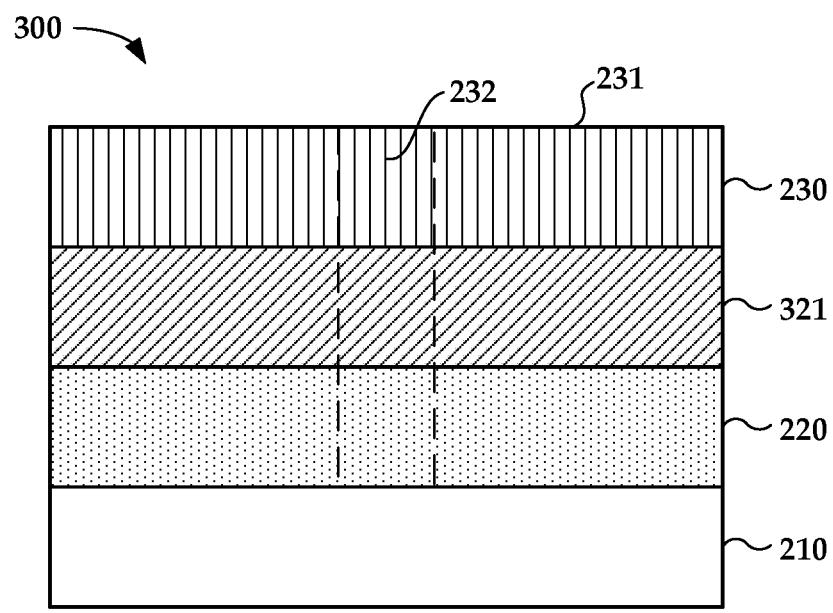
FIG. 3 is a cross-sectional diagram of a magnetic stack having a soft magnetic underlayer (SUL) in accordance with embodiments discussed herein.

FIG. 3 illustrates a magnetic stack 300 according to some embodiments. The stack 300 includes a NTE layer 220 as discussed in connection with FIG. 2 and is similar in many respects to the stack 200 of FIG. 2. However, stack 300 differs from stack 200 at least in that stack 300 additionally includes a soft magnetic underlayer 321 (SUL). The NTE layer 220 is disposed between the substrate 210 and the SUL 321. The SUL 321 may comprise multiple sub-layers.

Figure 4:
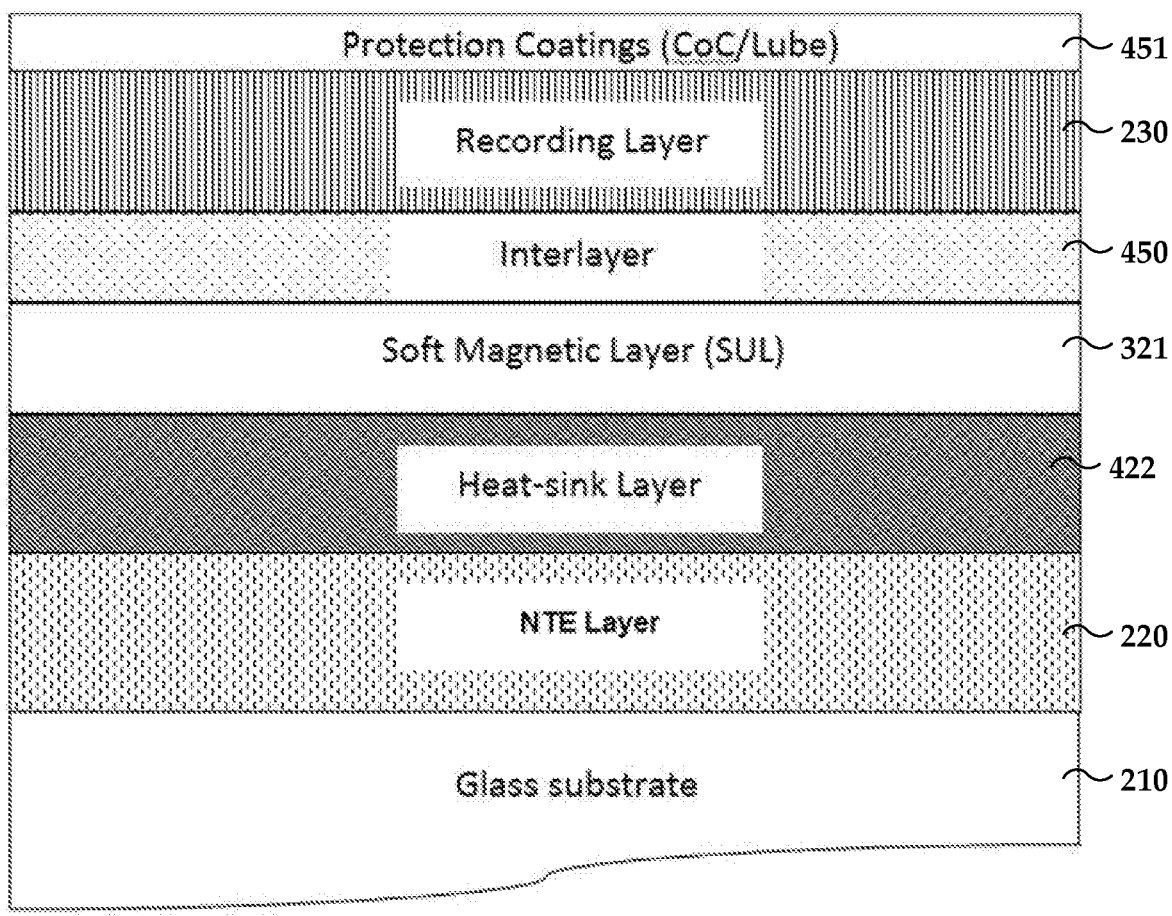
FIG. 4 is a cross-sectional diagram of a magnetic stack having a heatsink layer in accordance with embodiments discussed herein.

FIG. 4 illustrates a magnetic stack 400 according to some embodiments. The stack 400 includes a NTE layer 220 and is similar in many respects to the stack 300 of FIG. 2. However, stack 400 differs from stack 300 in that stack 400 additionally includes a heat sink layer 422.

The heat sink layer 422 may be disposed between the SUL 321 and the NTE layer 220. The heat sink layer 422 may include multiple sublayers. Alternatively, the NTE layer 220 can be disposed between the heatsink layer 422 and the SUL 321.

FIG. 4 also shows one or more interlayers 450 that may be disposed between the SUL 321 and the magnetic recording layer 230. For example, the interlayers 450 can include one or more orientation layers for controlling the orientation growth of the grains of the magnetic recording layer 230. As previously discussed, one or more protective coatings 451 may be disposed over the magnetic recording layer 230.

As shown in FIGS. 2 through 4, the NTE layer 220 can be introduced between the substrate 210 and the other materials/layers above the substrate 210, including the magnetic recording layer 230, the SUL 321, the heatsink layer 422, the interlayers 450, and the protective layers 451.

While referred to generally as a layer, the NTE layer can be a single layer or can be a plurality of sub-layers. In embodiments wherein the NTE layer comprises a plurality of sub-layers, the sub-layers may each have different thermal expansion coefficients. For example, in some embodiments, at least one of the sub-layers of the NTE layer can have a CTE that is different at least one other sub-layer of the NTE layer. In some embodiments two or more of the sub-layers may have the same CTE.

Figure 5A:
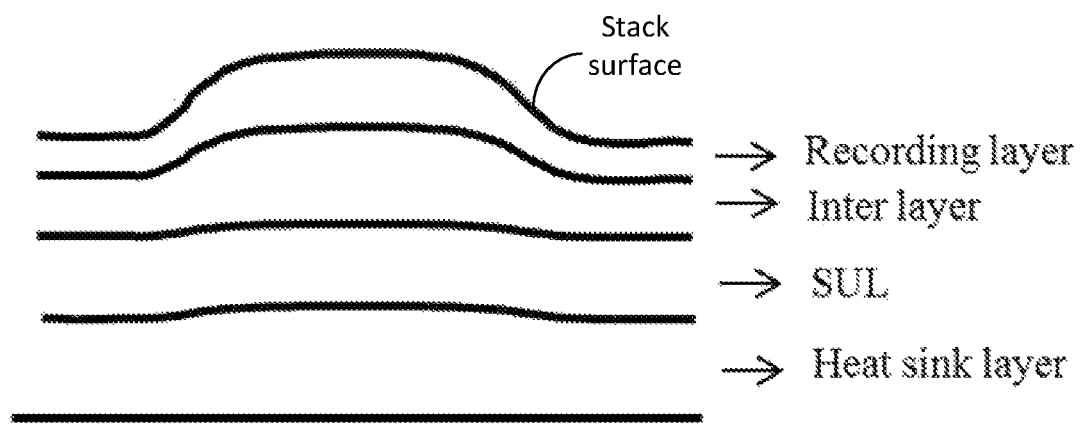
FIG. 5A is a cross-sectional view of a magnetic recording stack without a negative thermal expansion layer when exposed to NFT heating.
Figure 5B:
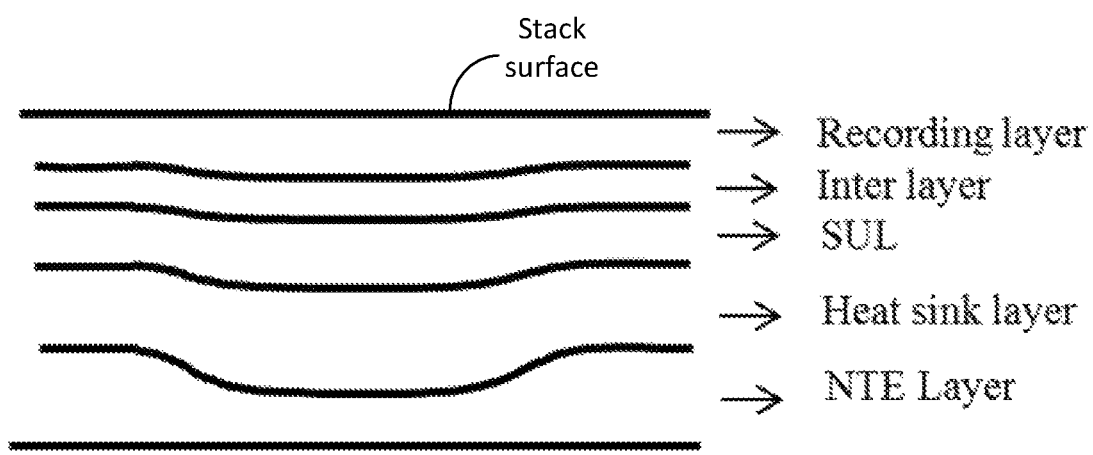
FIG. 5B is a cross-sectional view of a magnetic recording stack including a negative thermal expansion layer exposed to NFT heating in accordance with embodiments discussed herein.

The effects of the NTE are further illustrated in FIGS. 5A-B. In FIG. 5A, overall thermal profile changes (e.g., media surface protrudes, thereby reducing fly-height) occur under NFT heating for a HAMR media stack without an NTE layer. For example, each of the layers in the stack protrudes, to varying degrees. For stacks without an NTE layer, as represented by FIG. 5A, this results in the surface of the media stack opposing the substrate protruding into the air-bearing of the HAMR drive and creating a variation in clearance height at the interface of the slider and disk.

FIG. 5B includes an NTE layer and instead shows that a flat, or substantially, flat stack surface can be maintained during NFT heating. While the thermal profile of the stack layers may vary, they do so within the media stack without interfering with the stack surface. The negative coefficients of thermal expansion of the NTE layer result in thermal profile changes opposite to those of FIG. 5A (e.g., a negative expansion), such that the other stack layers, such as the heatsink layer, SUL, interlayer and/or recording layer, expand into, e.g., cave in, or depress, into the NTE layer. The NTE layer effectively absorbs the thermal profile changes without substantially affecting the media surface and resulting fly heights. Maintaining a flat, or substantially flat, media surface during HAMR write operations can reduce clearance variations and improve HAMR hard drive reliability. Because the NTE layer reduces variation in overall thermal profile of the media stack and reduces variation in fly-height, the NTE layer can also reduce thermal fatigue failures and delamination issues and improves drive reliability.

Figure 6:
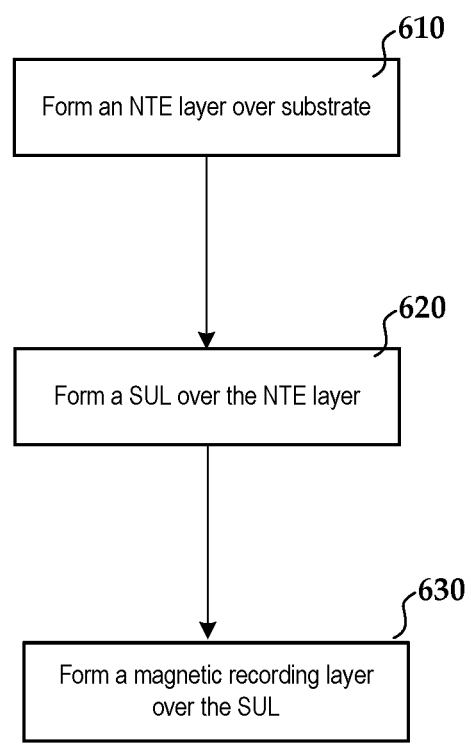
FIG. 6 illustrates a method for making a magnetic recording stack in accordance with embodiments discussed herein.

FIG. 6 is a flow diagram of a process of forming a magnetic stack such as a HAMR media stack in accordance with some embodiments. An NTE layer is formed 610 over a substrate. A SUL is formed 620 over the NTE layer. A magnetic recording layer is formed 630 over the SUL. Conventional deposition methods may be utilized for formation of the negative thermal expansion layer, such as sputter depositions. According to some embodiments, a heatsink layer may be formed such that the heatsink layer is disposed between the SUL and the NTE layer.

One or more interlayers can be formed over the one or more soft underlayers. Optionally, one or more overcoat layers can be disposed on the magnetic recording layer. Alternatively, the heatsink layer may be formed over the substrate, and the negative thermal expansion layer is formed over the heatsink layer. In this alternative structure, one or more soft underlayers are formed over the negative thermal expansion layer such that the negative thermal expansion layer is interposed between the heatsink layer and the soft underlayer structure.

Optionally, one or more additional layers, e.g., adhesion, seedlayers, are formed over the substrate. The negative thermal expansion layer produced by the process of FIG. 6 or other variations such as those discussed herein provide a HAMR stack with a substantially flat media surface facing the slider and NFT when the HAMR stack is heated for writing.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A stack comprising:
   a substrate;
   a magnetic recording layer;
   a soft magnetic underlayer disposed between the magnetic recording layer and the substrate; and
   a negative thermal expansion (NTE) layer having a thickness of about 300 nm to about 600 nm and disposed between the substrate and the soft magnetic underlayer, the NTE being configured to reduce thermal protrusion of a surface of the stack opposite the substrate in a local region to less than about 0.5 nm when the magnetic recording layer is heated to a magnetic writing temperature of the magnetic recording layer.

2. The stack of claim 1, wherein the magnetic writing temperature is about the Curie temperature of the magnetic recording layer.

3. The stack of claim 1, wherein the NTE layer is configured to reduce the thermal protrusion of the heated portion to less than about 0.25 nm when the magnetic recording layer is heated to the magnetic writing temperature of the magnetic recording layer.

4. The stack of claim 1, wherein the NTE layer is configured to reduce the thermal protrusion of the heated portion to less than about 0.15 nm when the magnetic recording layer is heated to the magnetic writing temperature of the magnetic recording layer.

5. The stack of claim 1, further comprising a heatsink layer disposed between the NTE layer and the soft magnetic underlayer.

6. The stack of claim 1, wherein a stability factor of the magnetic recording layer is greater than about 60.

7. The stack of claim 1, wherein the NTE layer is a single layer.

8. The stack of claim 1, wherein the NTE layer comprises a plurality of sub-layers wherein at least one sub-layer of the plurality of sub-layers has a thermal expansion coefficient that is different from at least another sub-layer of the plurality of sub-layers.

9. The stack of claim 1, wherein the NTE layer has a negative thermal expansion coefficient greater than the absolute value of about $-0.5 \times 10^{-6}$.

10. The stack of claim 1, wherein the NTE layer has a negative thermal expansion coefficient less than the absolute value of about $-30 \times 10^{-6}$ K$^{-1}$.

11. The stack of claim 1, wherein the NTE layer comprises at least one of the following: a manganese-based nitride, a copper-manganese-based nitride, FeNi, a doped FeNi alloy, a tungstate, and $(HfMg)(WO_4)_3$.

12. The stack of claim 1, wherein the NTE layer comprises at least one of the following: $Sm_{2.75}C_{60}$, $Bi_{0.95}La_{0.05}NiO_3$, Invar (Fe-36Ni), Invar (Fe$_3$Pt), $Tm_2Fe_{16}Cr$, CuO nano particles, Ni-based oxide $Bi_{0.95}La_{0.05}NiO_3$, $LaCu_3Fe_4O_{12}$, and a cyanide.

13. A stack comprising:
    a substrate;
    a magnetic recording layer; and
    a negative thermal expansion (NTE) layer disposed between the substrate and the magnetic recording layer, wherein the NTE layer comprises a plurality of sub-layers wherein at least one sub-layer of the plurality of sub-layers has a negative thermal expansion coefficient that is different from at least another sub-layer of the plurality of sub-layers.

14. The stack of claim 13, further comprising a soft magnetic underlayer disposed between the NTE layer and the magnetic recording layer.

15. The stack of claim 14, further comprising a heat sink layer.

16. The stack of claim 15, wherein the heatsink layer is disposed between the soft magnetic underlayer and the NTE layer.

17. The stack of claim 15, wherein the NTE layer is disposed between the heat sink layer and the soft magnetic underlayer.

18. A method comprising:
    forming a negative thermal expansion (NTE) layer over a substrate, wherein the NTE layer comprises a plurality of sub-layers wherein at least one sub-layer of the plurality of sub-layers has a negative thermal expansion coefficient that is different from at least another sub-layer of the plurality of sub-layers;
    forming at least one soft magnetic underlayer over the NTE layer; and
    forming a magnetic recording layer over the soft magnetic underlayer.

19. The method of claim 18, further comprising forming a heat sink layer, the heat sink layer disposed between the NTE layer and the soft magnetic underlayer.

20. The method of claim 18, wherein the NTE layer has a negative thermal expansion coefficient between about $-0.5 \times 10^{-6}$ to about $-30 \times 10^{-6}$ K$^{-1}$.

* * * * *